Jan. 28, 1930.                R. J. BRITTAIN, JR                 1,745,319
                        JOURNAL BOX AND CAR FRAME SUPPORT
                        Filed March 21, 1928          2 Sheets-Sheet 1

Inventor:
RICHARD J. BRITTAIN, JR.,
By
His Attorney.

Jan. 28, 1930.  R. J. BRITTAIN, JR  1,745,319
JOURNAL BOX AND CAR FRAME SUPPORT
Filed March 21, 1928    2 Sheets-Sheet 2
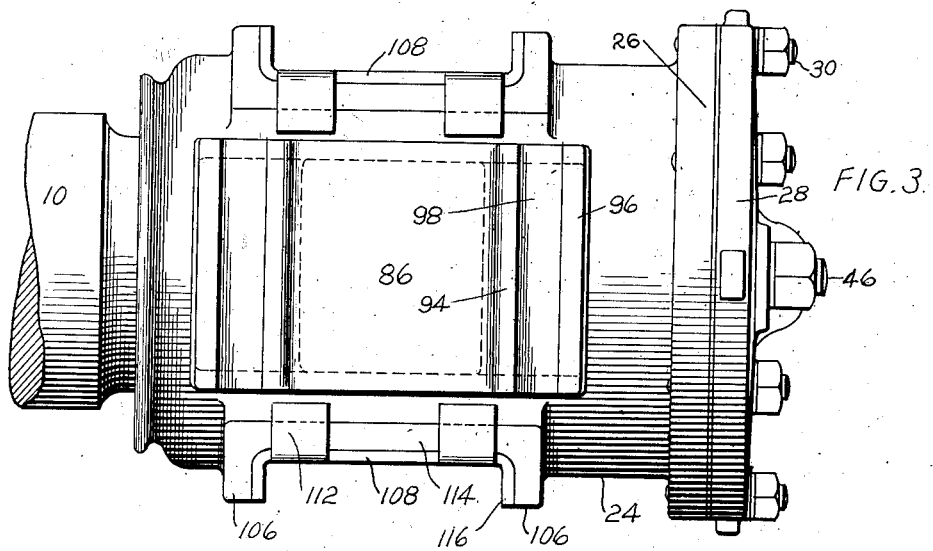
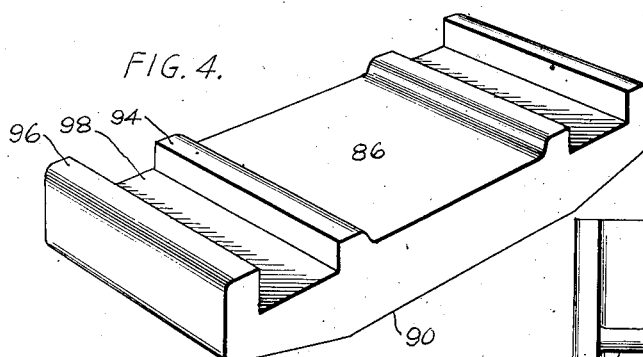
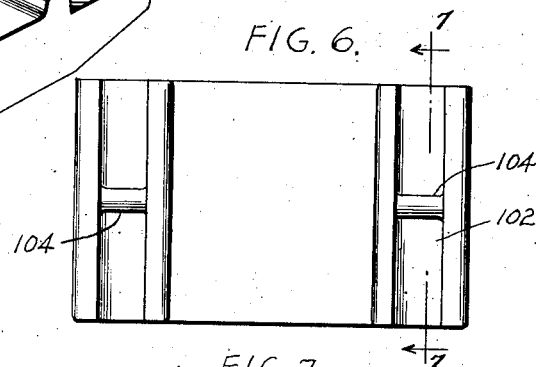
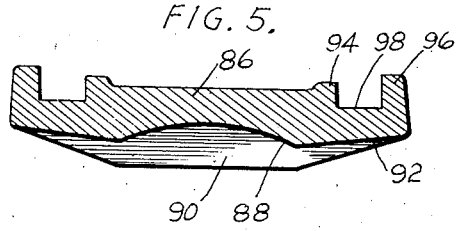
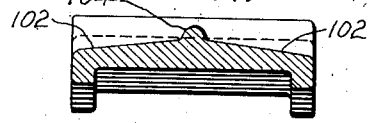
Inventor:
RICHARD J. BRITTAIN, JR.,
By
His Attorney.

Patented Jan. 28, 1930

1,745,319

UNITED STATES PATENT OFFICE

RICHARD J. BRITTAIN, JR., OF NEWARK, NEW JERSEY, ASSIGNOR TO GENERAL MOTORS CORPORATION, OF DETROIT, MICHIGAN, A CORPORATION OF DELAWARE

JOURNAL BOX AND CAR-FRAME SUPPORT

Application filed March 21, 1928. Serial No. 263,299.

This invention relates to journal boxes and car frame supports and comprises all the features of novelty herein disclosed. An object of the invention is to provide improved means for supporting car frame members on an axle box. Another object is to provide a device for equalizing the load imposed by spaced frame members on a journal box. Another object is to provide a tiltable equalizer block for preventing the cramping of axle bearings due to an unbalanced load on the axle box. To these ends and to improve generally and in detail on devices of this character, the invention also consists in the various matters hereinafter described and claimed.

The invention, in its broader aspects, is not necessarily limited to the specific embodiments selected for illustration in the accompanying drawings in which Fig. 1 is a longitudinal vertical section of a car journal box and associated parts.

Fig. 3 is a plan view.

Fig. 4 is a perspective view of an equalizer block.

Fig. 5 is a longitudinal central section of the equalizer block.

Fig. 6 is a plan view of a modified form of equalizer block and

Fig. 7 is a section on the line 7—7 of Fig. 6.

Figure 1:
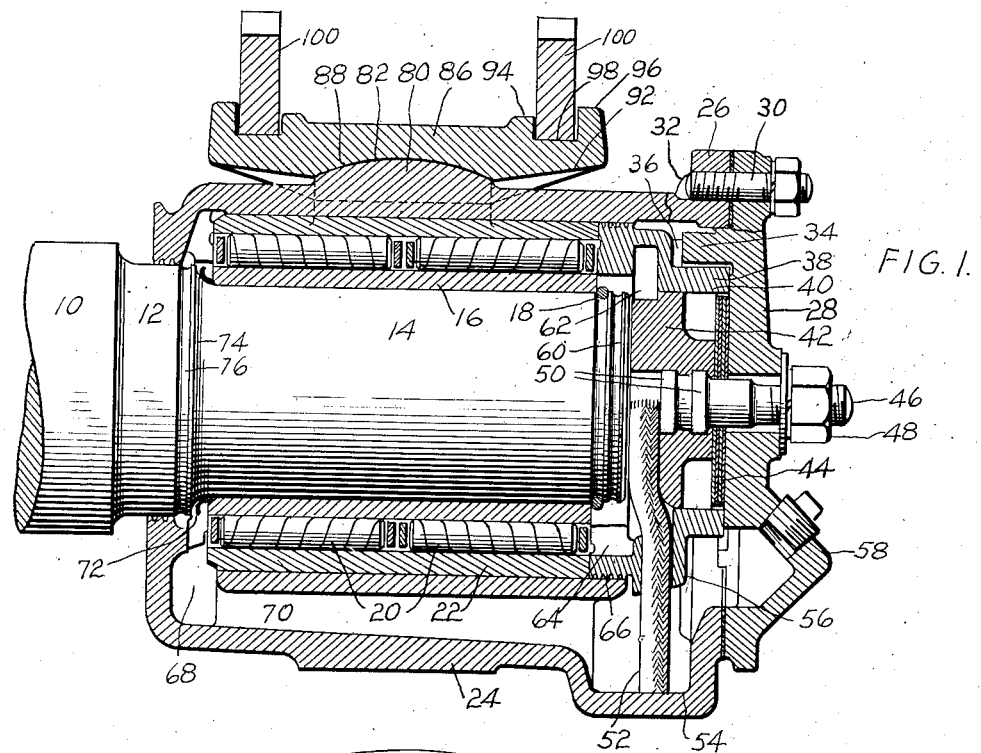

The numeral 10 indicates a shaft or axle with stepped cylindrical surfaces 12 and 14, a sleeve 16 being shrunk or pressed on the surface 14 and held by a split ring 18. Two sets of roller bearings 20 are interposed between the sleeve 16 and a lining 22 in the bore of a journal box or casing 24. The outer end of the box has an out-turned flange 26 to which an end cap 28 is fastened by bolts 30, the bolts being welded to the flange as indicated at 32. The end cap has a lug 34 extended inwardly into a slot 36 in a retainment ring 38 to hold the latter from rotation. The retainment ring is provided with a square opening 40 receiving a square thrust block 42 and spacing plates 44, the block and spacing plates being held tightly against the end cap by a bolt 46 and nut 48. The bolt has square collars 50 cast in a square opening of the thrust block to hold the bolt from rotation. The thrust block is preferably of brass and its inner end face opposes the end face of the axle, lubricant being lifted to the opposing faces by a wick 52. The wick extends from a lubricant reservoir 54 in the box, through a boss 56 of the retainment ring 38, to a recess in the thrust block. Lubricant is admitted through a hollow boss 58 in the end cap and, after lubricating the thrust face of the axle, collects on a rib 60 and is thrown off into an annular groove 62 of the retainment ring and drains through a notch 64 to the bearings. The retainment ring has grease grooves at 66 fitting the bore of the box and partitions off the end of the axle from the reservoir so that the oil must pass through the bearings before returning to the reservoir through a vertical passage 68 and inclined drain passage or core 70 at the bottom of the box. The inner or rear end of the box has grease grooves closely fitting the surface 12 of the axle and lubricant, working inwardly of the axle, is arrested by a washer 72, rib 74 and groove 76.

Figure 2:
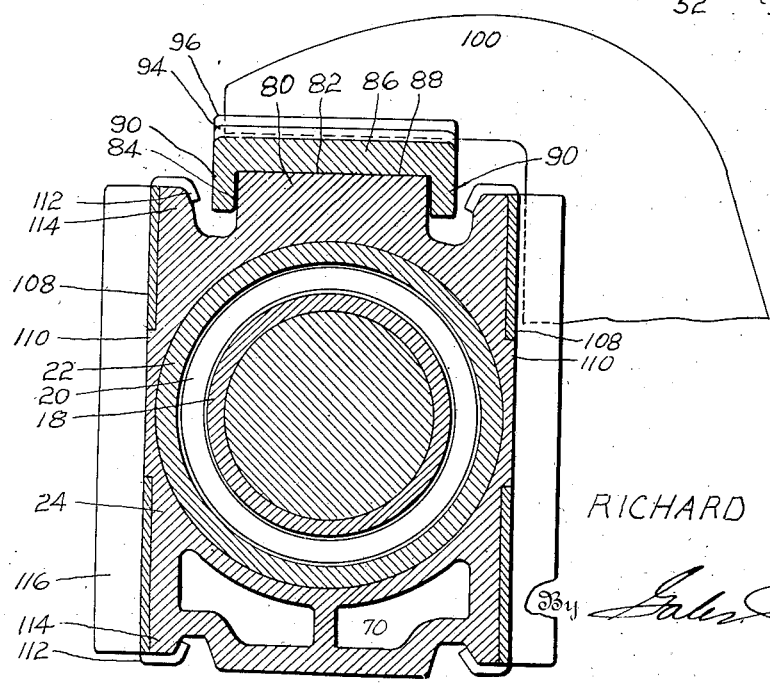
Fig. 2 is a central transverse section.

The top of the axle box is provided with an upwardly extending projection 80 which is arched longitudinally of the axle to provide a cylindrical seat 82. The sides of the projection are flat as indicated at 84 in Fig. 2. Mounted on the projection is a tiltable equalizer block or plate 86 having, on its under side, a cylindrical seat 88 fitting the seat 82. The equalizer block can thus tilt longitudinally of the axle and axle box but is prevented from tilting crosswise or coming off by depending side flanges 90 which embrace the flat sides 84 of the projection. The block slants upwardly and outwardly at the ends as indicated at 92 to provide clearance with the box and, on the upper side, the ends are provided with spaced ribs 94 and 96 forming cross grooves or seats 98 for frame members such as the usual equalizer bars 100 which carry the weight of the car body. The seats 98 are equally spaced from the axis of tilting and the load carried by the bars 100 is always transferred or applied by the equalizer block 86 to the center of the box. This prevents cramping of the bearings due to an unbalanced load. In the modification of Figs. 6 and 7, each seat comprises oppositely inclined faces 102 meeting at a rounded protuberance 104 to fit a slot in the equalizer bar, thereby allowing the bar to rock.

Both sides of the axle box are provided with outwardly extending spaced projections 106 which straddle the usual car frame pedestals (not shown). Each side of the box is provided with a wear plate 108 of channel form having its web portion or body slotted to receive a protuberance 110 of the box. Each wear plate has pairs of securing lugs 112 at top and bottom bent over and welded to ribs 114 on the box. The side arms 116 of the wear plate are co-extensive with the spaced projections 106 of the box.

I claim:

1. In a device of the character described, in combination, a journal box, a shaft journalled in the box, an equalizer block seated on the box to tilt freely longitudinally of the shaft, means for preventing the block from moving crosswise of the shaft, and equalizer bars seated on the top of the tiltable block; substantially as described.

2. In a device of the character described, in combination, a journal box having an upward projection provided with a cylindrical seat arching longitudinally of the box, and an equalizer block having a cylindrical recess fitting the cylindrical seat, the block having side flanges embracing the sides of the projection; substantially as described.

3. In a device of the character described, in combination, a journal box having an upward projection provided with a convex seat arching longitudinally of the box, a tiltable block having a concave recess fitting the convex seat with depending side flanges embracing the sides of the projection, and the block having spaced seats for frame members on its upper surface; substantially as described.

4. In a device of the character described, in combination, a journal box having an upward projection with flat sides and a convex seat arched longitudinally of the box, a tiltable block having a concave recess fitting the convex seat with depending side flanges embracing the flat sides of the projection, and the block having its ends extended beyond the ends of the convex seat and provided with cross grooves to receive spaced frame members; substantially as described.

5. In a device of the character described, a tiltable equalizer block having a concave seat on its under side and flat side flanges at the sides of the concave seat, the block having its ends extended beyond the ends of the seat and provided with cross grooves on the upper side; substantially as described.

6. In a device of the character described, a tiltable equalizer block having a concave seat on its under side and flat side flanges at the sides of the concave seat, and the block having spaced ribs on its upper surface to form grooved seats; substantially as described.

7. In a device of the character described, a tiltable equalizer block having a concave seat on its under side, and spaced ribs extending crosswise of the block on its upper side and arranged in pairs equally spaced from the seat; substantially as described.

8. In a device of the character described, a tiltable equalizer block having a concave seat on its under side and a pair of seats for frame members on its upper side; substantially as described.

9. In a device of the character described, in combination, a journal box having the top provided with an arcuate seat arching longitudinally thereof, a tiltable block extending longitudinally of the box and having an arcuate seat on its under side engaging the seat on the box, one of said engaging members having retaining side flanges and the other engaging member fitting between said flanges to prevent the block from moving crosswise of the box, and the top of the block having spaced seats near the ends for frame members; substantially as described.

In testimony whereof I hereunto affix my signature.

RICHARD J. BRITTAIN, Jr.

CERTIFICATE OF CORRECTION.

Patent No. 1,745,319.  Granted January 28, 1930, to

RICHARD J. BRITTAIN, JR.

It is hereby certified that error appears in the printed specification of the above numbered patent requiring correction as follows: Page 1, line 51, for the word "brass" read "bronze"; and that the said Letters Patent should be read with this correction therein that the same may conform to the record of the case in the Patent Office.

Signed and sealed this 25th day of February, A. D. 1930.

(Seal)

M. J. Moore,
Acting Commissioner of Patents.